April 16, 1968  A. THUN  3,377,883
PEDAL
Filed Sept. 22, 1965  2 Sheets-Sheet 1
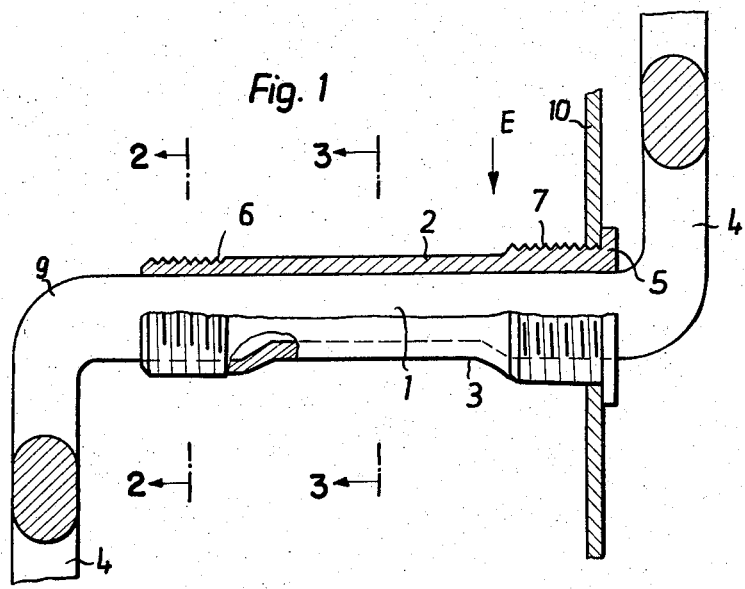
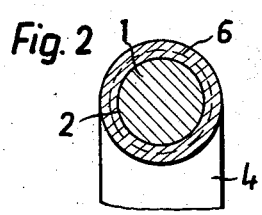
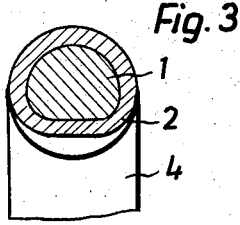
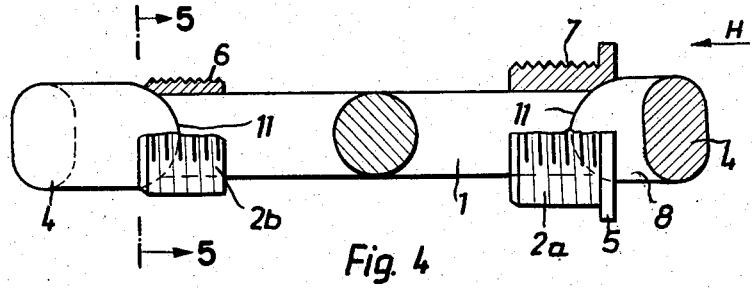
INVENTOR
Alfred Thun
BY Spencer & Kaye
ATTORNEYS

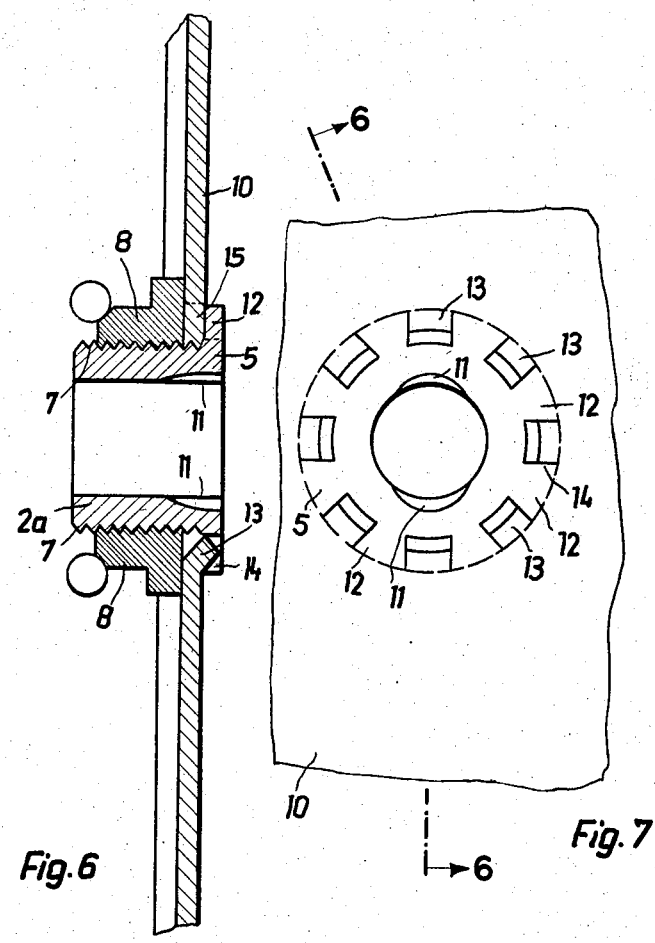
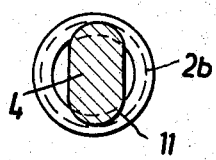

United States Patent Office 3,377,883
Patented Apr. 16, 1968

3,377,883
PEDAL
Alfred Thun, Neuenloher Weg 14,
Ennepetal-Altenvorde, Germany
Filed Sept. 22, 1965, Ser. No. 489,284
Claims priority, application Germany, July 16, 1965,
T 29,003
9 Claims. (Cl. 74—594.2)

ABSTRACT OF THE DISCLOSURE

A pedal arrangement for bicycles incorporating a bar having a central portion and flat end portions. The end portions are bent at approximately a right angle to the axial extension of the central portion and in directions opposite to each other, so that the central portion forms a pedal shaft and the end portions form cranks for the pedal arrangement. Sleeve means including at least one unitary tubular sleeve are mounted on the central portion of the bar. The sleeve means have threading thereon for supporting ball bearing means. The inner surface of the sleeve means is, through the entire length, in direct contact with the central portion of the bar. Means are provided for fixedly and non-rotatably securing the sleeve means and the central portion of the bar to each other.

---

The present invention relates to a pedal arrangement for bicycles and more particularly to a novel construction for a one-piece or so-called Fauber bearing and a method for producing the same.

Previously, the Fauber bearings comprised a pedal arrangement wherein the pedal shaft and the cranks were drop-forged as a common unit with the two cranks being displaced by 180° with respect to each other. Subsequently, threads for receiving the ball bearing assemblies were provided on the pedal shaft and thereafter, the complete pedal arrangement was buffed and nickel or chrome-plated. One of the cranks was further provided with a finger-like extension formed from the same piece for engaging a sprocket wheel radially mounted on the pedal shaft and thus providing a mounting of the sprocket wheel which was secured against independent rotation about the shaft. The sprocket wheel was detachably clamped for axial mounting between a shoulder formed on a portion of the pedal arrangement and the adjacent ball bearing assembly.

The Fauber bearing produced in the above-described manner has the drawback that the production of the shaft and the cranks as a single unit is relatively difficult, and required forging dies and other special large machines. Thus, the prior methods for producing a Fauber bearing require a relatively high expenditure in terms of machines, tools and labor.

It is therefore an object of the present invention to provide a Fauber bearing pedal arrangement for bicycles which is economical to produce.

Another object of the present invention is to provide a Fauber bearing pedal arrangement of novel construction and high durability.

These objects as well as others are achieved according to the present invention wherein a Fauber bearing pedal arrangement is formed by providing at least one preformed sleeve having a thread thereon which serves as the support means for the ball bearing assemblies and the sprocket wheel, the sleeve being mounted on a round bar and fixedly secured thereon. Thereafter, the end portions of the round bar are first flattened by compressing the same, for forming the pedal crank portion, and subsequently they are bent almost at right angles to the axial extension of the central portion of the round bar forming the pedal shaft and in directions opposite to each other. Subsequently, an indentation is pressed into the pedal shaft and the sleeve in approximately the center of their longitudinal extensions for arresting movement of the sleeve on the pedal shaft, this being done at the same time that the round bar is being bent at its ends.

A feature of an embodiment of the present invention for arresting movement of the sleeve with respect to the round bar consists in having the flat-pressed portions of the round bar extend into the pedal shaft portion and preferably engage at least one corresponding recess formed in the sleeve in such a manner that shaft and sleeve cannot shift with respect to each other. The sleeve is preferably mounted on the round bar in frictional engagement therewith, with the recess being provided in the region of a face of the sleeve. There may also be provided a variation of this feature wherein the sleeve comprises several sections having recesses therein for flush engagement with the flat-pressed round bar portions.

Another feature of the present invention is that the sleeve is further provided with an integrally formed flange, i.e., formed from the same piece, in the region of one of its end faces, and that means for detachably connecting the sprocket wheel thereto are provided at the flange.

Additional objects and advantages of the present invention will become apparent upon consideration of the following description when taken in conjunction with the accompanying drawings in which:

FIGURE 1 shows, in partial longitudinal cross section, a Fauber bearing pedal arrangement for bicycles according to the present invention.

FIGURE 2 is a cross-sectional view taken through the line 2—2 in FIGURE 1.

FIGURE 3 is a cross-sectional view taken through the line 3—3 in FIGURE 1.

FIGURE 4 shows, in partial longitudinal cross section, another embodiment of a pedal arrangement seen in the direction of arrow E of FIGURE 1.

FIGURE 5 is a cross-sectional view taken through the line 5—5 of FIGURE 4.

FIGURE 6 is a cross-sectional view of a further embodiment of a pedal arrangement according to the present invention having a sprocket wheel and bearing assembly mounted thereon, and taken along the line 6—6 of FIGURE 7, the latter being an end view seen in the direction H of FIGURE 4.

Referring now to the drawings, there is shown in FIGURE 1 a preformed sleeve 2 having been mounted on a round bar 1 of drawn steel having a material strength of 60 kg./mm.² There is also shown an indentation 3 which was pressed into the sleeve 2 and into the round bar 1, so that the sleeve 2 and the round bar 1 are connected with each other in such a manner that both axial displacement and rotation with respect to each other is prevented. Furthermore, the indentation results in a so-called bushing trough being formed which facilitates, in a conventional manner, the insertion of the pedal arrangement in the bearing housing which is mounted in the bicycle frame. The end portions 4 of the round bar extending beyond the sleeve are flattened by compression and then bent almost at right angles and in opposite directions to form the cranks 4 of the pedal arrangement as shown in FIGURE 1, with the terminal portions being shaped to form connection eyes, not shown, for receiving the pedals. The sleeve 2 is furthermore provided with a radially extending integral flange 5 and an outer thread 6 and 7. The core diameter of the thread 7 is preferably a little larger than the outer diameter of the thread 6, with the thread 6 being dimensioned to permit the ball bearing assemblies 8 which are threadable onto the threads 6 and 7 to be guided across the bend 9. A sprocket wheel 10 is furthermore pushed onto the sleeve 2 so that it can not shift thereon, and is preferably tightly clamped between the flange 5 and a ball bearing assembly to be threaded onto the axial extension of thread 7.

The embodiment of FIGURES 4 and 5 differs from that of FIGURES 1, 2 and 3 in that the sleeve means mounted on the bar 1, instead of being constituted by a single sleeve, is constituted by two sections, namely, sleeves 2a and 2b, which are mounted on the round bar 1 in frictional engagement therewith, the sleeve 2a having the thread 7 and the sleeve 2b having the thread 6. In order to prevent the sleeves from twisting from their original position, the flat-pressed end portions 4 of the round bar extend into the pedal shaft region and flushly engage corresponding recesses 11 formed in the end faces of the sleeve 2a and 2b, as shown in FIGURES 4 and 5.

In FIGURES 6 and 7, there is shown a preferred embodiment for detachably connecting the sleeve flange 5 and the sprocket wheel 10 to each other by means of a multiple spline arrangement. The flange 5 of the sleeve 2a is provided with teeth 12 extending substantially radially and defining gaps 14 therebetween. The sprocket wheel 10 is provided with a perforated rim about the surface adjacent to the axial extension of the sleeve 2a. Alternate perforated rim portions 13 are bent out of their original plane, i.e., the plane of the sprocket wheel 10, and are inserted into the gaps 14 between the teeth 12 of the flange 5, while the other perforated rim portions 15 remain in the plane of the sprocket wheel and are mounted axially adjacent to the teeth 12 of the flange 5. In order to provide a complete, detachable and axial mounting of the sprocket wheel 10 on the sleeve 2a, a ball bearing assembly 8 is screwed onto the sleeve 2a.

Thus, an advantage of the present invention is that a detachable connection is obtained between the sprocket wheel and the pedal arrangement, without the requirement for mounting portions to be provided on the cranks or pedal shaft for the connection. This connection provides relatively large moment arms between the pedal arrangement and the sprocket wheel so that large forces can be transmitted from the pedals to drive the bicycle and also provides a relatively durable connection. The connection according to the present invention also permits the manufacture of the sleeve and the sprocket wheel, in a fully automatic manner, before the sleeve is provided on the pedal arrangement.

According to the present invention, both the round bar and the sleeve are cold-formed. Thus, the threads on the sleeve can be provided automatically, i.e., the feeding of the sleeves to the thread-cutting machines, particularly, can be conducted in a fully automatic manner. In contradistinction to the known methods, it is not necessary to provide expensive forging dies and to heat the castings. In addition, it is no longer necessary to remove the burrs formed on the pieces in the forging and casting process which step was required heretofore, so that the manufacturing costs for a pedal arrangement produced in accordance with the invention are reduced to approximately half of the previous cost.

Another feature is that the pedal arrangement produced according to the method of the present invention is formed from drawn round steel and preferably steel having a material strength of about 60 kg./mm.² The use of drawn round steel in the manufacturing process thus eliminates the need for buffing the surface of the pedal arrangement in order to chrome-plate the same or provide other finishes thereon, since the surface of drawn round steel having been cold-pressed to a flat or similar form is sufficiently smooth for a subsequent surface-finishing procedure. The article of this invention is additionally distinguished by a fiber orientation which is more favorable than has heretofore been obtained.

It is also noted that by pressing the rod flat and bending the same, an increase in the strength and rigidity of the structure is achieved, thus leading to a further increase in bending strength and providing for a more durable pedal arrangement.

It will be understood that the above description of the present invention is susceptible to various modifications, changes and adaptations, and the same are intended to be comprehended within the meaning and range of equivalents of the appended claims.

What is claimed is:

1. A pedal arrangement for bicycles, comprising, in combination:
   (a) a bar having a central portion and flat end portions said end portions being bent at approximately a right angle to the axial extension of said central portion and in directions opposite to each other, said central portion forming a pedal shaft and said end portions forming cranks for said pedal arrangement;
   (b) sleeve means including at least one unitary tubular sleeve mounted on said central portion of said bar and having threading thereon for supporting ball bearing means, the inner surface of said sleeve means being, throughout its entire length, in direct contact with said central portion of said bar; and
   (c) means for fixedly and non-rotatably securing said sleeve means and said central portion of said bar to each other.

2. A pedal arrangement as defined in claim 1 wherein said means (c) are constituted by a frictional interengagement between said sleeve means and said central portion of said bar.

3. A pedal arrangement as defined in claim 1 wherein said bar and said sleeve means are cold-formed.

4. A pedal arrangement as defined in claim 1 wherein said bar consists of drawn steel having a material strength of approximately 60 kg./mm.².

5. A pedal arrangement as defined in claim 1 wherein said sleeve means consist of a single sleeeve, and wherein said means (c) comprise an indentation pressed into said single sleeve and said central portion of said bar in approximately the center of their respective lengths.

6. A pedal arrangement for bicycles, comprising, in combination:
   (a) a bar having a round central portion and flat end portions, said end portions being bent at approximately a right angle to the axial extension of said round portion and in directions opposite to each other, said round portion forming a pedal shaft and said end portions forming cranks for said pedal arrangement;
   (b) sleeve means mounted on said central portion and having threaded thereon for supporting ball bearing assemblies and a sprocket wheel; and
   (c) said sleeve means being fixedly secured to said bar, with said sleeve means being provided with a recess in at least one end face thereof and said flat portions of said bar extending into said central portion for engagement with said recess for preventing rotation of said sleeve with respect to said bar.

7. A pedal arrangement as defined in claim 6 wherein said sleeve means comprise at least two sections, each of which is threaded, and wherein said means (c) comprise a recess in at least the end face of each respective section for engagement with a respective flat portion of said bar.

8. A pedal arrangement as defined in claim 7 and further including a sprocket wheel mounted on said sleeve means and wherein said means for detachably connecting said flange and said sprocket wheel comprises a multiple spline arrangement, said flange being provided with radially extending teeth defining gaps therebetween and said sprocket wheel being provided with a perforated rim about the surface adjacent to the axial extension of said sleeve means, said perforated rim having alternate perforated rim portions bent out of the plane of said sprocket wheel for engagement in a flush manner with said tooth gaps of said flange, said bent perforations defining other perforated rim portions therebetween remaining in the plane of said sprocket wheel, said other perforated rim portions being mounted axially adjacent to said teeth of said flange when said bent perforations engage said tooth gaps.

9. A pedal arrangement for bicycles, comprising, in combination:
   (a) a bar having a round central portion and flat end portions, said end portions being bent at approximately a right angle to the axial extension of said round portion and in directions opposite to each other, said round portion forming a pedal shaft and said end portions forming cranks for said pedal arrangement;
   (b) sleeve means mounted on said central portion and having threading thereon for suporting ball bearing assemblies and a sprocket wheel;
   (c) said sleeve means being provided with a radially extending integral flange portion in the region of one of its end faces;
   (d) means provided on said flange for detachably connecting a sprocket wheel to said sleeve; and
   (e) means for fixedly securing said sleeve means to said bar.

References Cited
UNITED STATES PATENTS

| | | |
|---|---|---|
| 599,492 | 2/1898 | Carter. |
| 604,710 | 5/1898 | Connell _____ 74—594.2 |
| 619,339 | 2/1899 | Penseyres _____ 74—594.2 |

FRED C. MATTERN, JR., *Primary Examiner.*

W. S. RATLIFF, *Examiner.*